Oct. 12, 1948.  J. M. CERCOWNAY  2,451,275
TABLE ASSEMBLY FOR AUTOMOBILES
Filed Jan. 30, 1947  4 Sheets-Sheet 1
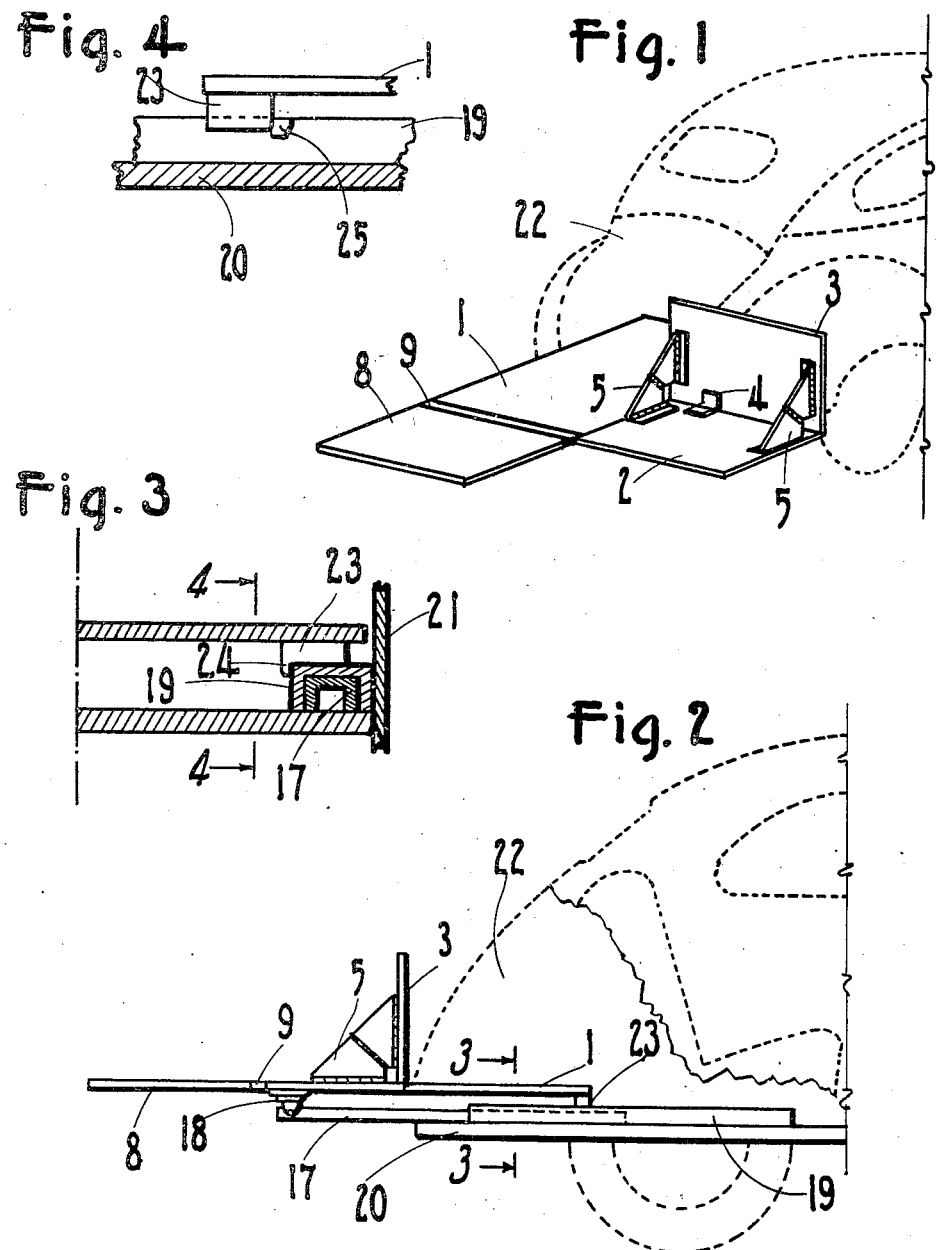
INVENTOR.
John M. Cercownay
BY Stewart Blackman
ATTORNEY Oct. 12, 1948.  J. M. CERCOWNAY  2,451,275
TABLE ASSEMBLY FOR AUTOMOBILES
Filed Jan. 30, 1947  4 Sheets-Sheet 2

INVENTOR.
John M. Cercownay
BY Stewart Blackman
ATTORNEY

Oct. 12, 1948.  J. M. CERCOWNAY  2,451,275
TABLE ASSEMBLY FOR AUTOMOBILES
Filed Jan. 30, 1947  4 Sheets-Sheet 3
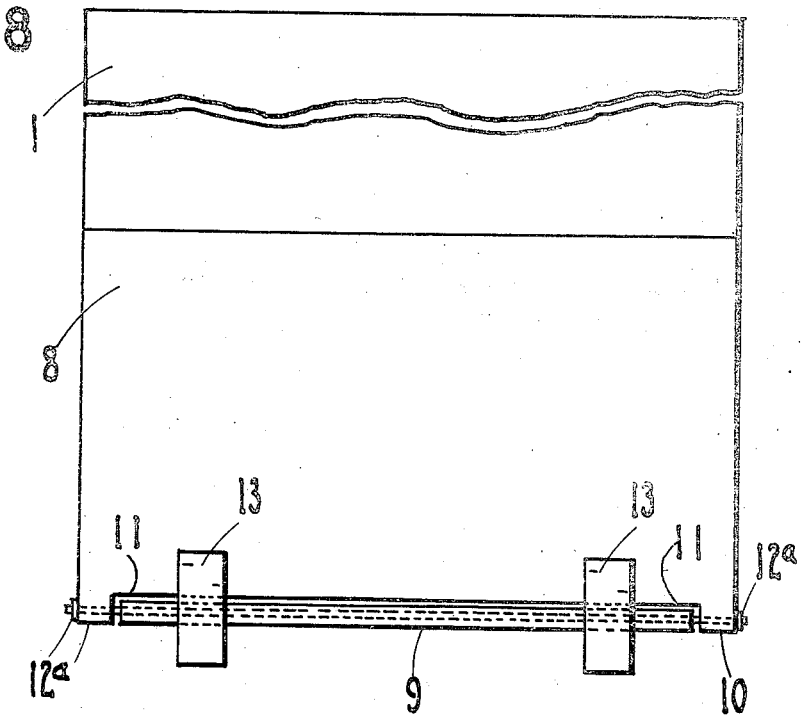
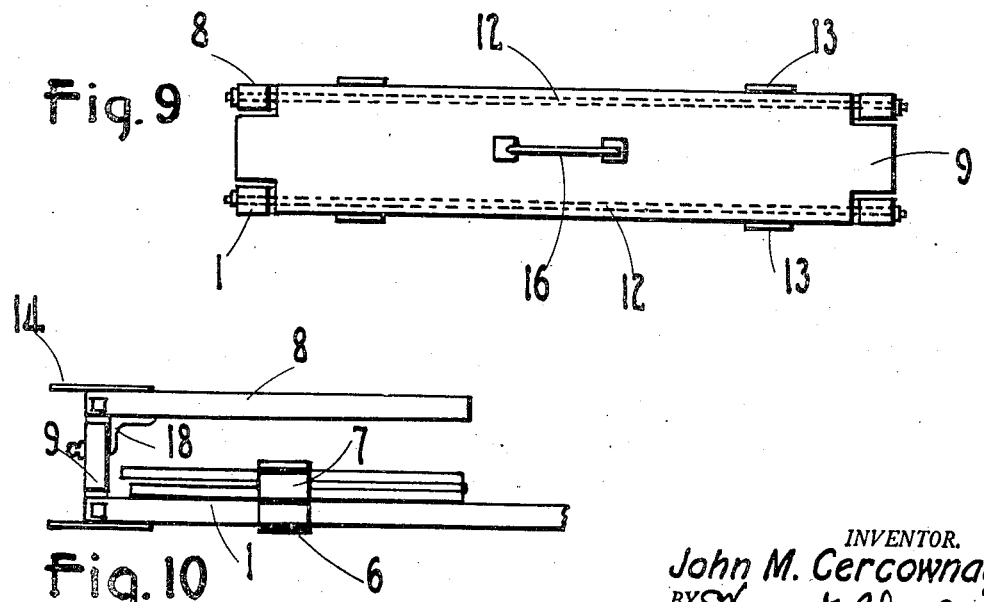
INVENTOR.
John M. Cercownay
BY Stewart Blackman
ATTORNEY

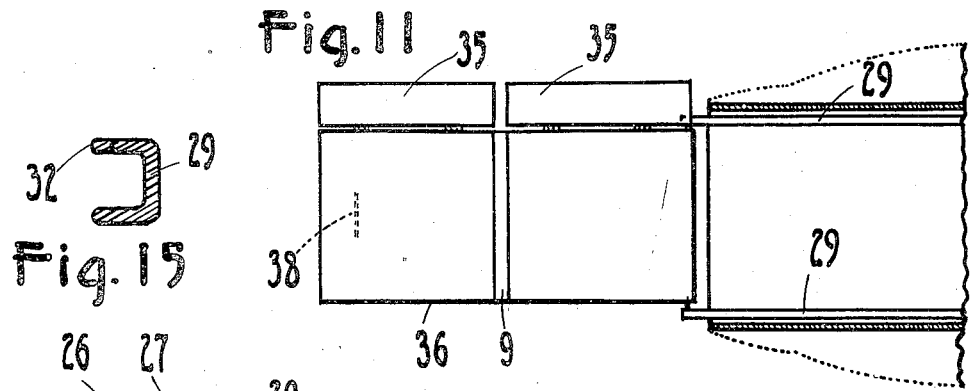
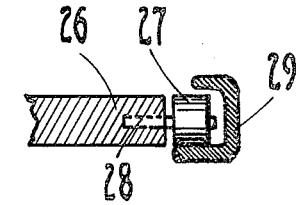
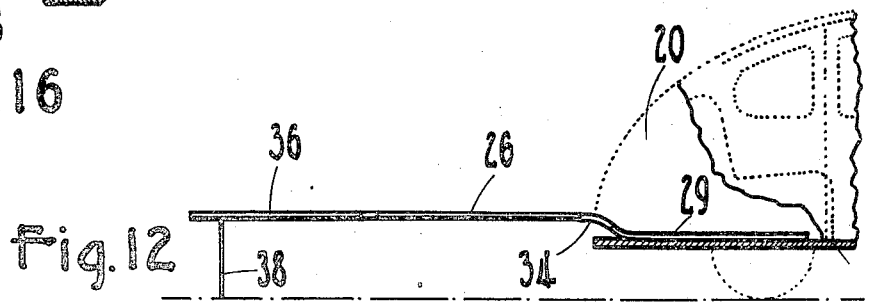
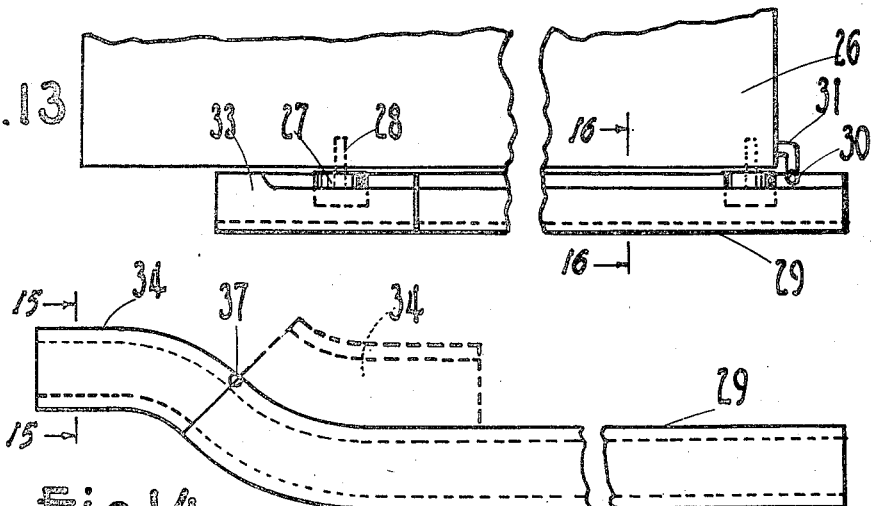

Patented Oct. 12, 1948

2,451,275

UNITED STATES PATENT OFFICE 2,451,275

TABLE ASSEMBLY FOR AUTOMOBILES

John M. Cercownay, Fort Lauderdale, Fla.

Application January 30, 1947, Serial No. 725,295

3 Claims. (Cl. 311—21)

The invention relates to improvements in automobile bodies.

Vehicles of the type to which the invention may be applied have a compartment, normally accessible from the rear of the car, for the accommodation of luggage, spare tire and the like, but the invention is not limited, within the purview thereof, to any specific type of vehicle or to the relative location of the compartment therein.

An object of the invention is to provide a table assembly for automobiles which may be readily and conveniently stowed in the luggage or storage compartment thereof.

Another object of the invention is to provide a table assembly for the purposes described which will be readily accessible for extension and compact when stowed.

Another object is to provide a table assembly which may be readily incorporated into the compartment structure of a conventional automobile body.

Another object is to provide a collapsible table assembly which may be readily and economically manufactured.

Another object is to provide a collapsible table assembly which may be readily utilized for workshop, cooking or bedding purposes.

According to the invention, the table assembly has a main supporting leaf or panel which is slideable from the compartment structure of the automobile, and supportable thereby; a side panel or panels hingeably connected to the main panel and foldable thereover; a cover panel hingeable to the main panel endwise thereof and foldable thereover.

The invention is exemplified in an automobile body shown in the accompanying drawings, in which the views are as follows:

Fig. 1 is an isometric view of the table assembly in extended position in general relation to an automobile body (shown in broken lines);

Fig. 2 is a side elevation of the view shown in Fig. 1 with the compartment wall partially broken away;

Fig. 3 is a section taken on line 3—3 of Fig. 2; and

Figure 5:
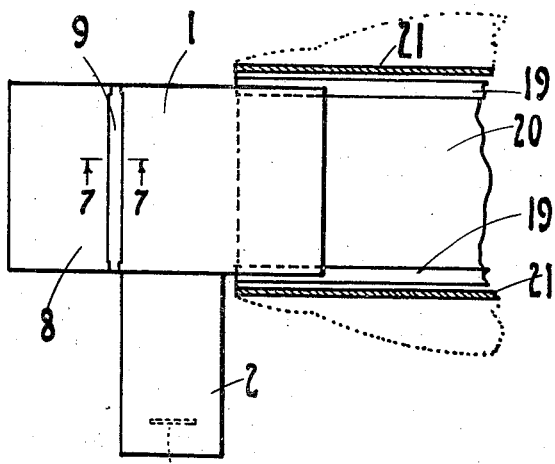
Figure 6:
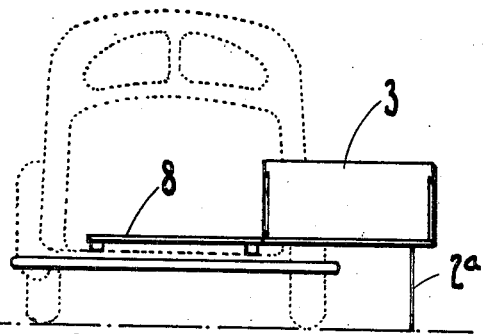
Figure 6A:
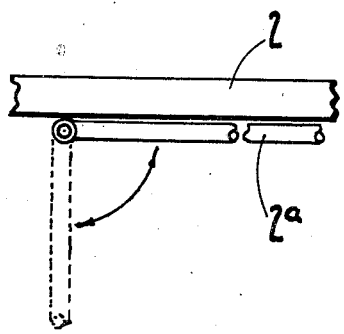
Figure 7:
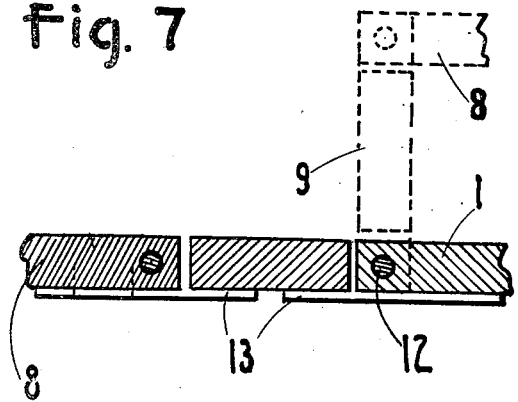

Fig. 4, a section on line 4—4 of Fig. 3;

Fig. 5 is a plan view of the extended table in relation to the car;

Fig. 6 is an end elevation of the assembly, extended;

Fig. 6a is a detail of a shelf supporting means;

Fig. 7 is a section taken on line 7—7 of Fig. 5;

Fig. 8 is a plan of the table assembly folded for stowage;

Fig. 9 is an end elevation of the view shown in Fig. 8;

Fig. 10 is a side elevation of the view shown in Fig. 9;

Fig. 11 is a plan view of a modified form of the invention; and

Fig. 12, a side elevation thereof;

Fig. 13 is a fragmentary plan of the main panel and the guide rail support therefor;

Fig. 14 is a side elevation of the guide rail;

Fig. 15 is a section taken on line 15—15 of Fig. 14; and

Fig. 16, a section taken on line 16—16 of Fig. 13.

The table assembly comprises a main support panel 1, which carries hingeably connected thereto, at the side thereof, a shelf panel 2.

The shelf panel 2 has pivoted thereto at the rearmost edge thereof, a normally upstanding back panel 3 which is foldable upon the shelf panel 2 through hinges 4, and inwardly foldable gores 5, the construction of which is described in my earlier Patent No. 2,214,575, of September 10, 1940. The hinge 6, whereby the shelf panel is pivoted to the main panel 1 may be of the type known in the art as a "table hinge," having an intermediate leaf 7 to accommodate the overall depth, when folded, of the thicknesses of the shelf panel 2, the back panel 3, and the gores 5, therebetween.

The shelf panel may be supported at its outer end by an upright leg member 2a, which is hingeably connected to the underside of the panel. The leg member may be pivoted to lie against the face of the panel when stowed, a suitable recess (not shown) being formed in the face of the panel for the reception of the leg member. The construction of the connection whereby the leg is pivoted to the panel is well known in the art.

Hingeably connected to the main panel 1 along the outermost edge thereof, is a cover panel 8 which is pivoted to the main panel through an intermediate link panel 9. Along their adjacent edges, the main panel 1 and cover panel 8 are articulated as at 10 to form a recess portion 11 for the reception of the link panel 9 therebetween, to which they are pivoted by shafts 12 which are passed transversely through the link panel 9 and articulated portions 10 of the main and cover panels. Suitable bolt assemblies 12a are provided to hold the shafts in place.

The main and cover panels are fitted at the adjacent edges thereof with brace straps 13 which are secured on the outer surfaces. The braces 13 extend longitudinally of the panels to overhang the edges thereof as at 14. When the panels are extended the overhanging projections 14 butt against the link panel (Fig. 7) and thereby provide underlying supporting plates to impart rigidity to the table assembly.

An angle member 15 may be positioned along the interior corner formed by the link panel 9 and cover panel 1 and attached to the cover panel to provide a support whereby the cover panel may be retained in horizontal position when folded.

The link panel is provided with a drawer pull 16 to facilitate handling the folded table assembly in the manipulation thereof. It will be understood that the assembly may be utilized as a table without extending the panels, the cover 8 serving as the table top.

The main panel 1 is carried at its outer end by a pair of laterally-spaced, longitudinally-disposed shafts 17 to which it is secured by brackets 18.

The shafts 17 are slideably retainable in a pair of complementary outer sleeves or guide rails 19, of channel cross-section, which may be attached in any suitable manner to the floor 20, or walls 21, of the compartment 22.

The main panel 1 is carried at its inner end on the channels 19, through shoes 23, which are fastened on the underside of the panel 1 at the innermost end thereof and ride the channels during passage of the panel thereover.

The shoes 23 have formed on the inner faces thereof downwardly extending flanges 24, which serve to keep the panel from swerving or yawing laterally in its passage over the guide rails. A further function of the flanges 24 is to prevent the main panel from over-running the compartment, by engaging a limit stop 25, formed on the inner face of the channel 19 (Fig. 4).

Thus, the main panel 1, has slideable movement longitudinally of the compartment from a retracted position therein to the extended position shown in Fig. 2, in which latter position it is materially supported by the retention of the shafts 17 in the channels 19, which impart thereto a force on the principle of a cantilever beam.

The invention, in modified form, is further exemplified in the table assembly shown in Figs. 11 to 16.

In this form, the main panel 26 is fitted along each side thereof with a plurality of rollers 27, rotatable on spindles 28 extending laterally of the panel and secured thereto.

The rollers 27 travel in a pair of laterally-spaced guide rails 29, disposed longitudinally of the compartment along each side wall thereof to provide non-frictional movement of the main panel.

The main panel has fitted to the innermost end, at each side thereof, an upstanding lug 30 formed on a bracket 31 by which it is attached to the panel. The lug 30 is adapted to travel along the guide rail and functions to prevent the panel from over-running the rails by engaging limit stops 32, formed by a transverse extension of the upper flange of the guide rail, as at 33.

At their outermost extremities the rails 29, which extend exteriorly of the compartment, terminate in upwardly inclined portions whereby to impart an upward lift to the main panel 26, to thereby elevate the panel to clear obstructions such as bumpers or like accessories with which the vehicle may come equipped.

The upwardly-inclined terminal portions 34 are adapted to normally project exteriorly of the compartment and thus permit the addition of supplementary hingeable side panels 35 whereby to widen the useable surface of the table.

The upwardly-inclined portions 34 of the guide rails are pivotably retractable to the interior of the compartment through a hinge 37 formed transversely of each guide rail at the top thereof, and adapted to permit the portions 34 to be rotated back upon the main portion of the guide rails as shown in Fig. 15.

When in extended position, the table is supported at its inner end by the guide rails and at its outer end by a leg support 38, which may be pivotably connected to the panel 36 and foldable thereagainst, as hereinbefore described in reference to Fig. 2a.

It will be understood that the additional side panels, when folded over the main and cover panels may be accommodated in the space shown in Fig. 6 between the main and cover panels in their folded positions.

In the modified form, the main panel likewise has a cover panel 36 to which it is pivotably connected through link panel 9, hereinbefore described.

It will be understood further that the dimensions of the panels and the lateral spacing of the supporting guide rails may be modified to suit the dimensional characteristics of the compartment with which the automobile may come conventionally equipped, without departing from the spirit of my invention.

In practice, the table assembly is folded for stowage with shelf or side panels intermediate the cover and main panels. To extend the table the assembly is grasped by the draw pull 16 and drawn outwardly until the limit stops are engaged. The cover panel is folded back and the shelf or side panels are pivoted outwardly to bring all panels into substantially the same plane. The leg supports are then adjusted, as shown, and the table assembly ready for use.

It will be seen that the invention provides a compact form of table assembly and compartment structure for the reception thereof, and a substantially rigid table structure when extended for use.

Of course the invention is susceptible of various modifications without departing from the scope thereof, as hereinafter claimed:

I claim:

1. The combination with a storage compartment, of a pair of laterally-spaced guide rail channels arranged therein, a pair of complementary shafts slideable in said channels, a main panel carried by said shafts and movable therewith for withdrawal from said compartment, a pair of guide shoes secured to said panel and adapted to slideably engage said channels in movement therealong, flanges formed on said shoes, limit stops formed on said channels and engageable by said flanges to limit the movement of said panel in withdrawal from said compartment, a shelf panel pivoted to said main panel along the side edge thereof and foldable thereover, means to support said shelf panel at the outer end thereof, a cover panel linked to said main panel along the outer end thereof and foldable thereover, said guide rail channels having upwardly inclined terminal portions at the outer ends thereof to effect the elevation of said main panel upon withdrawal thereof from said compartment and said terminal portions being hingeably connected to said channels to permit the pivotable retraction thereof in relation to said channels.

2. The combination with a storage compartment, of a pair of laterally-spaced guide rail channels arranged therein, a pair of complementary shafts slideable in said channels, a main panel carried by said shafts and movable therewith for withdrawal from said compartment, a pair of guide shoes secured to said panel and adapted to slideably engage said channels in movement therealong, flanges formed on said shoes, limit stops formed on said channels and engageable by said flanges to limit the movement of said panel in withdrawal from said compartment, a shelf panel pivoted to said main panel along the side edge thereof and foldable thereover, means to support said shelf panel at the outer end thereof, a cover panel pivotably connected to said main panel endwise thereof, a link panel interposed intermediate said cover and said main panels, means carried by said cover and main panels and co-operating with said link panel to rigidly support said panels in substantially a common plane when in extended position, said guide rail channels having upwardly inclined terminal portions at the outer ends thereof to effect the elevation of said main panel upon withdrawal thereof from said compartment and said terminal portions being hingeably connected to said channels to permit the pivotable retraction thereof in relation to said channels.

3. The combination with a storage compartment, of a pair of laterally-spaced guide rails arranged therein, an extensible panel assembly carried by said guide rails and slideable therealong, said guide rails having upwardly-inclined terminal portions at the outer ends thereof to permit elevation of said panel assembly on withdrawal from said compartment, said terminal portions being hingeably connected to said guide rails to permit the pivotable retraction of said terminal portions relative to said guide rails.

JOHN M. CERCOWNAY.

REFERENCES CITED

The following references are of record in the file of this patent:

UNITED STATES PATENTS

| Number | Name | Date |
| --- | --- | --- |
| 1,549,957 | Belden | Aug. 18, 1925 |
| 2,114,575 | Cercownay | Sept. 10, 1940 |
| 2,160,958 | Critchlow | June 6, 1939 |
| 2,249,845 | Mitchell | July 22, 1941 |